June 10, 1941.   C. A. PEMBLE   2,245,495
OXYGEN SUPPLYING COMPOSITION
Filed Jan. 19, 1940

INVENTOR
CARL A. PEMBLE
By Paul, Paul Moore
ATTORNEYS

Patented June 10, 1941

2,245,495

UNITED STATES PATENT OFFICE 2,245,495

OXYGEN SUPPLYING COMPOSITION

Carl A. Pemble, St. Paul, Minn.

Application January 19, 1940, Serial No. 314,642

16 Claims. (Cl. 252—186)

The present invention relates to compositions capable of supplying oxygen when introduced into water and to methods of formulating and packing such compositions for use. The compositions are useful where a limited supply of oxygen is desired at a slow rate as during the handling of fish or for purifying or removing odors from water.

In the handling of fish, particularly during the transportation of fry during fish planting operations, or during the carrying of minnow bait in buckets, there is frequently severe loss due to suffocation unless the water is aerated. Mechanical aeration involves expensive and heavy mechanical devices feasible only in large scale handling.

According to the present invention, the problem of supplying limited amounts of oxygen to water used for fish is overcome by providing an article capable of giving off oxygen when placed in the water. The composition gives off the oxygen in the form of fine bubbles over a period of hours and while so doing, at any time, does not crumble, disintegrate or throw off into the water chemicals harmful to the fish.

It is accordingly an object of this invention to provide oxygen supplying compositions which are improved over previous compounds in that they may be placed directly into the water to be oxygenated.

More particularly it is an object of this invention to provide compounds for supplying oxygen to water in which fish are handled and to provide methods of formulating such compounds and working them into useful easily handled masses from which, in use, a relatively steady stream of oxygen gas in the form of fine bubbles will be evolved over a period of several hours, all without the contamination of the water by substances harmful to fish.

It is also an object of this invention to provide a composition of matter, formed into a porous mass which does not disintegrate when placed in water, but which will react in the presence of water to give off oxygen, and in reacting yield only substantially insoluble and harmless products which maintain the shape of the porous mass whereby they are not discharged into the water.

A further object is to provide a composition for oxygenating water which comprises various ingredients which are of such a nature that they may be readily compressed into a suitable container to facilitate handling, and whereby the composition of matter may be protected against moisture so that it may last definitely while sealed in such a container.

A further object is to provide a simple and inexpensive composition of matter which may be compressed into tablet form and dispensed to the public in air tight containers, whereby it may be kept indefinitely without danger of losing its original qualities.

Other and further objects of the invention are those inherent in the invention herein illustrated, described and claimed.

In carrying out the present invention, oxygen generating ingredients are formed into a porous mass capable of sustaining itself during and after reaction or they are packed into a porous container which sustains the reacting ingredients and retains the products of reaction.

These characteristics may be obtained by several methods of manufacture of which the following are exemplary:

Method I

In this method the porous mass is made to hold its shape by including in it a coarser porous framework of material that does not change during use of the composition. The reactive mixture fills the pores of this porous framework.

The reactive mixture is a mixture of substances that do not react when dry, but which react when wet to produce oxygen and other products. Water may be one of these other products, while the rest of these other products may not be more than slightly soluble, (for instance, calcium sulfate or secondary calcium phosphate). Furthermore, the rest of these products which are slightly soluble must not produce solutions harmful to fish. As an example of a combination of active ingredients, there may be used:

| | Parts by weight |
|---|---|
| Hydrated aluminum sulfate | 666 |
| Barium peroxide, anhydrous | 169 |
| Manganese dioxide, powdered | 90 |

The sulfate is crushed to 20 mesh or smaller and mixed with the other two, which are powders.

The products of reaction by this mixture in water are oxygen gas, water, and two insoluble solids, aluminum hydroxide and barium sulfate. The action of the manganese dioxide is catalytic, and it remains undissolved and unchanged throughout the reaction. Any other suitable catalyst may be used.

The reactive ingredients are mixed with coarse granules which have the ability to adhere to one another firmly when pressed together. The proportion must be determined by experiment. As an example, seven parts by volume of 10 mesh lead granules may be used with one part of the reactive mixture. Other coarse, adherent material such as granulated aluminum or tin may also be used.

Figure 1:
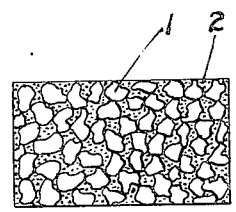
Figure 1 is a vertical sectional view showing one form of the oxygenating compositions of the present invention.

This final mixture is then compressed into a tablet such as that shown in Figure 1, by compressing the mixture in a tablet press using a pressure of about one ton per square inch, or forming the tablet by any other convenient method. When thus tableted, the lead forms a porous framework 1 containing the reactive mixture 2 in its pores.

Figure 2:
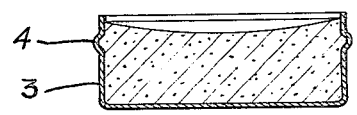
Figure 2 is a sectional elevation showing the composition of matter compressed in a suitable container.

It is also convenient to package the mixture by compressing it into a container such as a sheet metal can 3 as shown in Figure 2. The use of the container eliminates the necessity of expelling the tablet from a mold and thus facilitates tableting. Furthermore, the container protects all but one side from the water, resulting in a slower initial evolution of oxygen, but a much more uniform and longer lasting evolution.

In pressing the mixture into the can, the mixture flows into the bead 4 where such is provided. The seal thus provided between the mixture and the can discourages entrance of water between the can wall and thus compelling reaction from the exposed face only.

Many other oxygen giving compositions may be used in Method I in place of the aluminum sulfate-barium peroxide mixture heretofore specified. The rules for selecting the reacting ingredients are, firstly, that one of the products of reaction, of course, be oxygen. Secondly, the products remaining after reaction, other than oxygen and water, should be substances whose saturated solutions are nontoxic. Thirdly the products of reaction, other than oxygen and water should be substances that are not more than slightly soluble in water. For the purposes of this invention, a substance is considered to be not more than slightly soluble when not more than 0.13 (thirteen hundredths) mole of it will dissolve in one liter of water. With this rule, oxygen supplying substances such as peroxides, perborates, permanganates and chromates may be selected and combined if necessary or desirable with other substances having needed properties such as acidifying or precipitating ability, the end products being always investigated by the above stated rule, and only such substances used as give oxygen and substances (other than water) whose saturated solutions are non-toxic and not more than 0.13 molar.

As examples of oxygen giving compositions, which fulfil the requirements of the stated rule and are therefore useful in Method I, there may be cited the following:

(I–a) Barium peroxide and aluminum sulfate (specified above)
(I–b) Calcium peroxide and ferric sulfate
(I–c) Magnesium peroxide and manganese sulfate
(I–d) Strontium peroxide and primary magnesium phosphate
(I–e) Barium peroxide and primary barium phosphate
(I–f) Barium permanganate, barium peroxide and calcium bisulfate
(I–g) Calcium permanganate, barium peroxide and calcium bisulfate
(I–h) Calcium perborate and manganese dioxide (as a catalyst)
(I–i) Barium percarbonate and manganese dioxide (as a catalyst)
(I–j) Bismuth tetroxide In compositions (I—a) through (I—e) hydrogen peroxide is first formed and it is convenient to add a catalyst such as manganese dioxide, metallic lead, cobalt oxide, nickel oxide, finely divided platinum or the like to hasten the breaking down of the hydrogen peroxide into oxygen and water. In compositions (I—f) and I—g) hydrogen peroxide is first formed and reacts with the permanganate, whereby the permanganate yields an amount of oxygen equal to that yielded by the hydrogen peroxide reacting with it. In all cases where hydrogen peroxide is broken down by manganese dioxide some manganese dioxide may also yield oxygen by reacting with the hydrogen peroxide but under usual conditions of low acidity such reaction is not extensive and the manganese dioxide acts mainly as a catalyst. Sufficient catalyst is used so that the water in which the composition is used shows no test for hydrogen peroxide.

*Method II*

In this method, the reactive mixture is held together in a container, a part of all of the walls of which are porous. In this method, the reactive ingredients are the same as those used in Method I.

The container may be a wrapping of cloth or paper or other suitable porous fabric; a container of marble, unglazed pottery, plaster, fritted glass, sandstone or other suitable solid, yet porous material; or a container with solid walls such as a sheet metal with a portion of the closure or porous fabric or other porous material may likewise be used.

Figure 4:
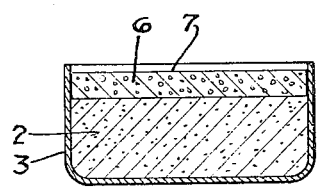
Figure 4 is a sectional view in elevation of another form of the invention utilizing a porous closure.

As an example, a mixture 2 of 120 parts of anhydrous magnesium sulfate, 72 parts of anhydrous calcium peroxide and 10 parts of manganese dioxide by weight may be packed in a metal can 3 as shown in Figure 4. For oxygenating the water of minnow buckets, the can is preferably made about 1¼ inches in diameter by ⅝ inch deep and is filled to within about ⅛ inch of the top. A marble or sandstone disc 6 is fitted into the can above the mixture 2 and cemented into place with shellac or other water insoluble cement. The disc must be pushed firmly against the powder to provide for capillary penetration of the water before being cemented.

In use, the water penetrates disc 6 and the oxygen liberated by the reacting ingredients flows outwardly through the pores and is liberated as tiny bubbles at the surface 7 of the disc 6.

For the container, there may also be used a box of plaster of Paris having a wall about ⅛ inch thick. The box is prepared and after drying is filled with the oxygen supplying mixture. The filling opening may then be closed by any method such as a cork stopper cemented in place.

Method III

In this method, the reactive mixture is in itself capable of maintaining its shape during and after the reaction in water.

The reactive oxygen yielding ingredients for use in Method III must (as in Methods I and II) be capable of first yielding oxygen and the products aside from water must be substances whose saturated solution is non-toxic and of no greater concentration than 0.13 molar. In addition, as a further requirement, the ingredients of the composition must be capable of being formed into a rigid porous mass which not only maintains its physical form before being wetted, but also maintains substantially the same physical form during and after reaction, without sloughing off or disintegrating into the water in which the mass is used.

There are two essential ingredients for the composition used in this method.

One of these essential ingredients is a peroxide, hereinafter referred to as "the peroxide," of a metal of group two of Mendelejeff's Periodic Arrangement (other than mercury or radium). These metals are: beryllium, magnesium, calcium, zinc, strontium, cadmium and barium. Barium peroxide and calcium peroxide are desirable because they are quite stable and inexpensive.

The other essential ingredient is a primary phosphate, hereinafter referred to as "the phosphate" of any of the metals of group two of Mendelejeff's Periodic Arrangement (except mercury or radium). Calcium monophosphate (primary phosphate), $Ca(H_2PO_4)_2$ is readily available and inexpensive and is therefore used most frequently.

In addition to these two essential ingredients a catalyst capable of decomposing hydrogen peroxide is desirable since hydrogen peroxide is an intermediate product. Manganese dioxide or any of the catalysts specified referred to under Method I, may be used:

Reactable proportions of the ingredients are used in order efficiently to utilize the ingredients. Thus, each mole (gram molecular weight) of phosphate requires from about 1 to about 2 moles of the peroxide, the preferred proportion being about 2 moles of phosphate to 3 moles of peroxide. The catalyst should amount to about 5% of the whole by weight, more or less, depending on the effectiveness of the particular catalyst used. Enough catalyst should be used so that the water gives no chemical test for hydrogen peroxide immediately after the introduction of the tablet.

When barium peroxide is used, it is desirable to add to the composition a mole of calcium sulfate for each mole or barium peroxide. This acts not only as an antidote for barium poisoning, should someone accidently swallow some of the composition, but also acts to precipitate any traces of barium monophosphate or secondary barium phosphate as barium sulfate and thus prevents the escape of these slightly soluble barium phosphates into the water containing the fish. About 5% of calcium sulfate is sufficient for this purpose.

Tests have shown that the omission of calcium sulfate has no bad effect on fish, but it is nevertheless desirable as a precaution. It tends to decrease the strength of the mass but not enough to impair its usefulness. Any form of powdered calcium sulfate may be used, plaster of Paris being quite satisfactory.

Examples of compositions useful in Method III are given by the following:

| Ingredients | Compositions | | |
|---|---|---|---|
| | III-a | III-b | III-c |
| Barium peroxide, anhydrous by weight | Percent 39.8 | Percent 49.4 | Percent 56.2 |
| Calcium monophosphate, anhydrous by weight | 55.2 | 45.6 | 38.8 |
| Catalyst such as manganese dioxide by weight | 5.0 | 5.0 | 5.0 |
| Moles of peroxide per mole phosphate | 1 | 1.5 | 2.0 |

The proportions in III—a correspond to the following reaction:

The proportions in III—b correspond to the following reactions:

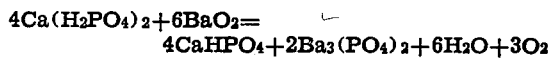

The proportions in III—c correspond to the following reaction:

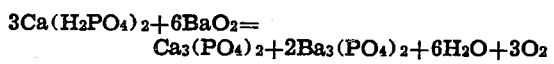

The reaction corresponding to III—b seems to prevail during the normal use of the composition.

If more than 1 mole of phosphate per mole of peroxide is used, there appears to be phosphate left over after completion of reaction III—a and this will be free to dissolve and diffuse into the water where it may in some instances be harmful to fish.

If more than 2 moles of peroxide per mole of phosphate is used, some of the peroxide appears to be left over after completion of reaction III—c. It will then decompose forming oxygen and hydroxide of the metal (in this case barium hydroxide), which is then free to dissolve and diffuse into the water where it may in some instances be harmful to fish.

Any molar proportion of peroxide to phosphate between 1 and 2 is safe and 1.5 has a wide margin of safety.

Figure 6:
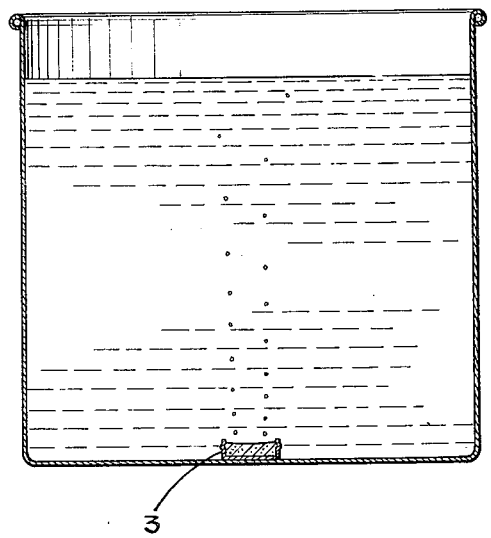
Figure 6 is a vertical sectional view of a fish container with one of the oxygenating compositions in place and in operation.
Figure 5:
Figure 5 is an isometric view of a modified form of self sustaining oxygen liberating device.

The compositions made by Method III are prepared by mixing the "air dry" ingredients, lightly grinding, if necessary, to break up lumps or large crystals. The mixture is then compacted into tablets such as that shown in Figure 5 by pressure of about 2000 pounds per square inch, the pressure used being sufficient to form good tablets but not enough to close the pores by crushing the granules. For tableting, it is desirable to use "air dry" materials, for by so doing, the water present appears to permit a slight initial reaction which bonds the particles together so as to prevent crumbling when the tableted material is placed in water. The compositions of Method III may also advantageously be tableted by pressing into a metal container such as those shown in Figures 2, 3 and 6.

After tableting or pressing into metal containers, it is desirable to prevent deterioration by drying the material. This may be done by placing the tablets or filled containers in a receptacle together with a desiccant such as quick lime, but a preferable method is to dry the product in an oven at about 250 degrees Fahrenheit for several hours. The latter method, however, can be used only when all the ingredients have been used in the anhydrous rather than the hydrated form.

Figure 3:
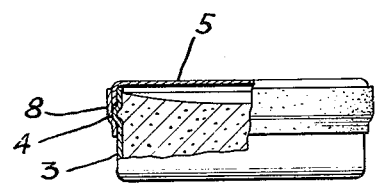
Figure 3 is an elevational view partly in section of the packaged composition of Figure 2 showing a cap and seal thereon.

The dried composition must be kept in a sealed container to prevent deterioration due to atmospheric moisture. If the composition is pressed into a metal container, this may be accomplished by capping the container and sealing with moisture proof tape 8 as shown in Figure 3, or by using a moisture tight cap.

My preferred composition useful under Method III contains the following ingredients:

| Ingredients | Composition III—d |
|---|---|
| | Percent by weight |
| Barium peroxide, anhydrous | 33.7 |
| Plaster of Paris | 30.3 |
| Monocalcium phosphate, anhydrous | 31.0 |
| Manganese dioxide, powdered | 5.0 |

About 20 grams of this composition is pressed as described in a seamless metal can, for sample, one which is 1¼ inches in diameter by ⅝ inch deep. It is oven dried for 2 hours at 250 degrees Fahrenheit and capped and sealed while hot with moisture proof cellulose acetate tape.

Since the commercial peroxide is only about 80% pure (the rest being oxide and hydroxide) a yield of about 400 cubic centimeters of oxygen is theoretically possible. When the lid is removed and the container dropped into the water, it gives off thousands of tiny bubbles briskly for about 6 hours. The oxygen is largely absorbed in the water, the water absorption being enhanced by the smallness of the bubbles. The oxygen supply is thus continuously replenished in the fish tank, where the article is used for that purpose. The rate of oxygen evolution drops off somewhat from the sixth to the tenth hour and then slows down rather abruptly. The oxygen yield during ten hours is somewhat over two hundred cubic centimeters. The remainder of the oxygen is given off too slowly to be of more practical use. A 20 gram mass of composition III—d packed as described will sustain 50 shiner minnows about 2 inches long from six to twelve hours in an ordinary gallon pail, where without the oxygen supply, the mortality would be nearly 100% within 4 hours.

The characteristics of rate of gas evolution and yield of oxygen depend on the quality of the materials used and somewhat upon the shape of the container. Where tablets are used without a container, the rate is relatively much higher at first, due to the larger surface of the tablet exposed to action of water, while when using the container, the reactive surface is limited to one face, all reaction being through that face. The metal container thus forms a water repellant coating for all but a portion of the mass of oxygen producing ingredients in the container. A somewhat similar control of the rate of oxygen evolution may be obtained in the tableted mass of Figure 5 by coating all but one face with a water repellant coating such as shellac. Reaction thus proceeds entirely from one face of the tablet and lengthens the time of evolution.

Obvious variations will occur to those skilled in the art and may be made without departing from the spirit of the invention herein described and claimed.

What I claim is:

1. An article of manufacture capable of steadily evolving oxygen when placed in fish containing water comprising a container having a porous wall capable of passing water and oxygen, and a mixture of reactive substances within said container, said substances being capable when wet of reacting to produce oxygen and solid compounds other than water which are not more than slightly soluble in water, said porous wall being sufficiently retentive to hold said solid compounds in said container.

2. A relatively hard self-sustaining mass capable of steadily evolving oxygen over a long period of time when placed in fish containing water, said evolution being without appreciable disintegration of the mass and without contamination of the water sufficient to injure fish in the water in which the mass is placed, comprising a mixture of relatively coarse granules of metal and relatively fine granules of a mixture of substances capable of evolving oxygen when wetted and of forming as end products relatively slightly soluble substances, said mixture being sufficiently compacted that the relatively large granules of metal contact and form a rigid porous framework for the relatively slightly soluble end product substances.

3. A relatively hard self-sustaining mass capable of steadily evolving oxygen over a long period of time when placed in fish containing water, said evolution being without appreciable disintegration of the mass and without contamination of the water sufficient to injure fish in the water in which the mass is placed, comprising a mixture of relatively coarse granules of metal and relatively fine granules of a mixture of substances capable of evolving oxygen when wetted and of forming as end products relatively slightly soluble substances, said mixture being compacted into a container having only one face openable for retaining the slightly soluble substances evolved by the reaction.

4. A relatively hard self-sustaining porous mass capable of steadily evolving oxygen over a long period of time when placed in water, said evolution being without appreciable disintegration of the mass and without contamination of the water sufficient to injure fish in the water in which the mass is placed, the active ingredients of said mass consisting essentially of a peroxide of a metal of the group consisting of beryllium, magnesium, calcium zinc, strontium, cadmium and barium, and a primary phosphate of a metal of said group, there being 1 to 2 moles of the peroxide present for every mol of the phosphate, said ingredients being compacted under a sufficiently heavy pressure to form a rigid porous body that is capable of retaining its shape and porosity in water and of entraining solid products of reaction, during and after reaction in water.

5. A relatively hard self-sustaining porous mass capable of steadily evolving oxygen over a long period of time when placed in water, said evolution being without appreciable disintegration of the mass and without contamination of the water sufficient to injure fish in the water in which the mass is placed, the active ingredients of said mass consisting essentially of a peroxide of a metal of the group consisting of beryllium, magnesium, calcium zinc, strontium, cadmium and barium, and a primary phosphate of a metal of said group, there being 3 moles of the peroxide present for every 2 moles of the phosphate, said ingredients being compacted under a sufficiently heavy pressure to form a rigid porous body that is capable of retaining its shape and porosity in water and of entraining solid products of reaction, during and after reaction in water.

6. A relatively hard self-sustaining porous mass capable of steadily evolving oxygen over a long period of time when placed in water, said evolution being without appreciable disintegration of the mass and without contamination of the water sufficient to injure fish in the water in which the mass is placed, the active ingredients of said mass consisting essentially of a peroxide of a metal of the group consisting of beryllium, magnesium, calcium zinc, strontium, cadmium and barium, and a primary phosphate of a metal of said group, there being 1 to 2 moles of the peroxide present for every mole of the phosphate, said ingredients being compacted under a sufficiently heavy pressure to form a rigid porous body that is capable of retaining its shape and porosity in water and of entraining solid products of reaction, during and after reaction in water, and a water repellent coating for all but a portion of the rigid porous body.

7. A relatively hard self-sustaining porous mass capable of steadily evolving oxygen over a long period of time when placed in water, said evolution being without appreciable disintegration of the mass and without contamination of the water sufficient to injure fish in the water in which the mass is placed, the active ingredients of said mass consisting essentially of a peroxide of a metal of the group consisting of beryllium, magnesium, calcium zinc, strontium, cadmium and barium, and a primary phosphate of a metal of said group, there being 1 to 2 moles of the peroxide present for every mole of the phosphate, said ingredients being mixed with a catalyst capable of decomposing hydrogen peroxide into oxygen and water, the whole mixture being compacted under a sufficiently heavy pressure to form a rigid porous body that is capable of retaining its shape and porosity in water and of entraining solid products of reaction, during and after reaction in water.

8. A relatively hard self-sustaining porous mass capable of steadily evolving oxygen over a long period of time when placed in water, said evolution being without appreciable disintegration of the mass and without contamination of the water sufficient to injure fish in the water in which the mass is placed, the active ingredients of said mass consisting essentially of a mixture of primary calcium phosphate and calcium peroxide, said ingredients being compacted under sufficiently heavy pressure to form a rigid porous body that is capable of retaining its shape and porosity in water and of entraining solid products of reaction, during and after reaction in water.

9. A relatively hard self-sustaining porous mass capable of steadily evolving oxygen over a long period of time when placed in water, said evolution being without appreciable disintegration of the mass and without contamination of the water sufficient to injure fish in the water in which the mass is placed, the active ingredients of said mass consisting essentially of a mixture of primary calcium phosphate and calcium peroxide there being about 1 to 2 moles of calcium peroxide for each mole of primary calcium phosphate present, said ingredients being compacted under sufficiently heavy pressure to form a rigid porous body that is capable of retaining its shape and porosity in water and of entraining solid products of reaction, during and after reaction in water.

10. A relatively hard self-sustaining porous mass capable of steadily evolving oxygen over a long period of time when placed in water, said evolution being without appreciable disintegration of the mass and without contamination of the water sufficient to injure fish in the water in which the mass is placed, the active ingredients of said mass consisting essentially of a mixture of primary calcium phosphate and barium peroxide, said ingredients being compacted under sufficiently heavy pressure to form a rigid porous body that is capable of retaining its shape and porosity in water and of entraining solid products of reaction during and after reaction in water.

11. A relatively hard self-sustaining porous mass capable of steadily evolving oxygen over a long period of time when placed in water, said evolution being without appreciable disintegration of the mass and without contamination of the water sufficient to injure fish in the water in which the mass is placed, the active ingredients of said mass consisting essentially of a mixture of primary calcium phosphate and barium peroxide there being about 1 to 2 moles of barium peroxide for each mole of primary calcium phosphate present said ingredients being compacted under sufficiently heavy pressure to form a rigid porous body that is capable of retaining its shape and porosity in water and of entraining solid products of reaction during and after reaction in water.

12. A relatively hard self-sustaining porous mass capable of steadily evolving oxygen over a long period of time when placed in water, said evolution being without appreciable disintegration of the mass and without contamination of the water sufficient to injure fish in the water in which the mass is placed, the active ingredients of said mass consisting essentially of a mixture of primary calcium phosphate, barium peroxide and calcium sulfate, said ingredients being compacted under sufficiently heavy pressure to form a rigid porous body that is capable of retaining its shape and porosity in water and of entraining solid products of reaction during and after reaction in water.

13. The method of making a hard self-sustaining porous mass capable of steadily evolving oxygen over a long period of time when placed in water, said evolution being without appreciable disintegration of the mass and without contamination of the water sufficient to injure fish in the water in which the mass is placed which comprises admixing a peroxide of a metal of the group consisting of beryllium, magnesium, calcium, zinc, strontium, cadmium and barium, with a primary phosphate of a metal of said group, said ingredients being in the air dry condition when mixed, compacting the resulting mixture under sufficiently heavy pressure to form a rigid porous body that is capable of retaining its shape and porosity in water and of entraining solid products of reaction during and after reaction in the water, and then drying said compacted rigid porous body.

14. An article of manufacture capable of evolving oxygen over a long period of time, comprising a small metallic container having a removable air-tight cover, the container having therein a mixture consisting essentially of primary calcium phosphate, barium peroxide, calcium sulfate and manganese dioxide, said ingredients being compacted within the container and against the walls thereof, under a sufficiently heavy pressure to form a rigid porous body tight against the walls of the container, said body being capable of retaining its shape and porosity and of entraining solid products of reaction while allowing evolution of oxygen gas when the article with the air tight cover removed is placed in water.

15. The article of manufacture set forth in claim 14 wherein the ingredients are used in approximately the following proportions by weight:

| | |
|---|---|
| Primary calcium phosphate | 40 to 26 parts |
| Barium peroxide | 29 to 36 parts |
| Calcium sulfate | 26 to 33 parts |
| Manganese dioxide | About 5% |

16. The article of manufacture set forth in claim 14 wherein the removable air-tight cover consists of a metal lid sealed by moisture resistant tape.

CARL A. PEMBLE.